Dec. 22, 1925.                                                  1,566,955
F. W. CURNAN
ENVELOPE FASTENER
Filed August 15, 1923

INVENTOR.
Frank W. Curnan
BY Wooster & Davis
ATTORNEYS.

Patented Dec. 22, 1925.

1,566,955

UNITED STATES PATENT OFFICE.

FRANK W. CURNAN, OF DERBY, CONNECTICUT.

ENVELOPE FASTENER.

Application filed August 15, 1923. Serial No. 657,638.

*To all whom it may concern:*

Be it known that I, FRANK W. CURNAN, a citizen of the United States, residing at Derby, county of New Haven, State of Connecticut, have invented a new and useful Envelope Fastener, of which the following is a specification.

This invention relates to metallic fastening devices for envelopes, particularly of the type which are secured to the body of the envelope and have one or more wings or fingers adapted to be passed through a reenforced opening in the flap of the envelope and then bent down parallel to the surface thereof to secure the free end of the flap to the body and thus close the envelope.

It has for an object to provide an improved fastening device of this character which will be simple in construction and may be stamped from sheet metal, which is provided with means to prevent injury to the user's fingers from the burr or sharp edge caused by this stamping operation, and in which the fingers or wings are so constructed as to bend perfectly adjacent the means for securing the fastener to the envelope but will remain straight outside of this bend.

It is also an object of the invention to provide improved means for securing the fastener to the envelope which will not require any drawing operation.

With the foregoing and other objects in view, I have devised the construction illustrated in the accompanying drawing, in which Fig. 1 is a plan view of an envelope showing the flap opened and my improved fastener applied thereto.

Figure 1:
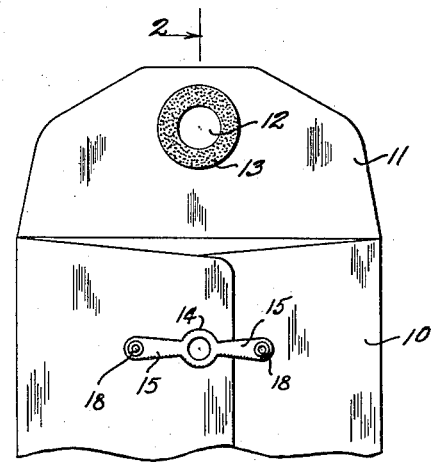
Figure 2:
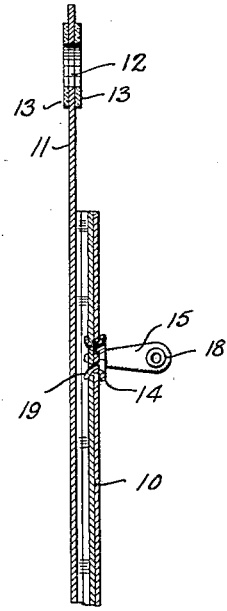
Fig. 2 is a longitudinal section through the same substantially on line 2—2 of Fig. 1 but drawn upon an enlarged scale.
Figure 3:
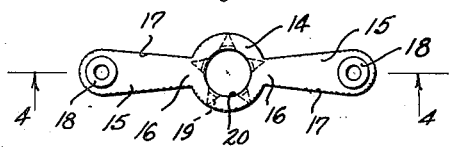
Fig. 3 is a top plan view of the fastener on an enlarged scale.
Figure 4:
Fig. 4 is a longitudinal section through the same substantially on line 4—4 of Fig. 3.

Referring to the drawing the body of the envelope is indicated at 10, and the flap or closure 11 having an opening 12 therethrough which is provided with a suitable reenforcing means, such as flat rings 13 of paper or other suitable material, secured to the flap. My improved clasp is stamped from sheet metal and comprises a central enlarged portion 14 from which extend on opposite sides thereof two wings or fingers 15. These wings or fingers are tapered longitudinally thereof with their narrowest portion at the point of connection of these wings with the central portion 14, as indicated at 16, and they grow gradually wider at their outer or free ends. With this construction as these wings are either pressed upwardly or downwardly at their outer ends they will always bend at the narrowest portion 16 because this is not only the weakest portion of the wings or fingers but also the leverage is greater at this point than at any other point on the wings. Thus the wings will remain straight from this point to the outer end and will bend only at this point.

When these clasps are punched from sheet stock there is a rough or sharp edge or bur along the edges of one side thereof which I have indicated on the drawing by the marks 17. These rough or sharp edges or burs are liable to injure and cut the fingers of the person manipulating the clasp in opening and closing the envelope, particularly if a large number are used, and therefore to prevent this injury I provide on the wings or fingers 15, preferably adjacent the outer ends thereof as it gives a better appearance, a bump or raised portion 18, which will, when the fingers are manipulated, prevent the operator's fingers coming in contact with the roughened or sharp edges or burs 17. This bump or raised portion may be of different shapes. In Figs. 1 to 5 I have shown it as a ring with a depressed center but in Figs. 6 and 7 the top thereof is flat and it is indicated by numeral 21.

Figure 5:
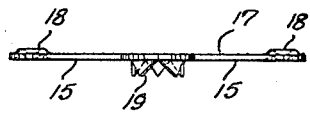
Fig. 5 is a side elevation thereof.
Figure 6:
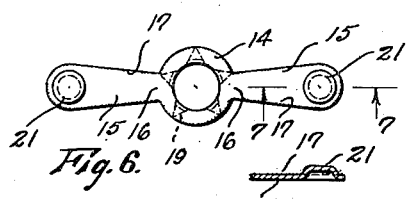
Fig. 6 is a top plan view of a slightly different construction.
Figure 7:
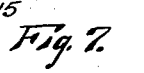
Fig. 7 is a sectional view of the outer portion of a finger of the clasp shown in Fig. 6, the section being substantially on line 7—7 of Fig. 6.
Figure 8:
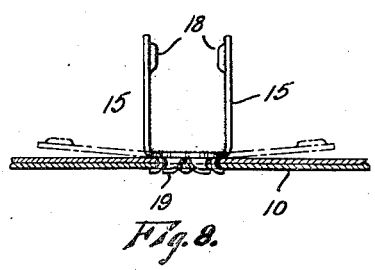
Fig. 8 is a transverse section through the body of the envelope and showing in elevation my improved fastener applied thereto.

I have also provided an improved means for securing the clasp to the envelope which may be formed at the time the clasp is punched from the flat stock by a simple punching operation without requiring any drawing operation and without removing any stock from the center of the clasp. This improved securing means comprises a series of triangular teeth 19 which when bent into the plane of the clasp meet at the center of the opening 20. The punch as it passes through the center of the clasp cuts the tapered sides of the teeth and force their free or pointed ends laterally to positions at right angles to the surface of the clasp, as shown in Fig. 5, leaving the opening 20. In fastening the clasp to the envelope these teeth are merely forced through the material of the envelope and bent outwardly on the opposite surface thereof to clinch the clasp to the envelope as shown in Figs. 2 to 8.

From the foregoing description it will be apparent that the clasp is extremely simple in construction and may be stamped from sheet metal at a single operation, and that due to the peculiar shape of the lateral wings or fingers they will bend only at the desired point adjacent the center portion without requiring any strengthening ribs or like devices. Also the provision of the raised portion on these wings will prevent injury to the fingers of the operator because of the bur or roughened edges which are formed incident to the punching operation.

Having thus set forth the nature of my invention, what I claim, is:

1. A fastener of the character described stamped from sheet metal stock and having a central or body portion, means for securing said central or body portion to an envelope, one or more wings integral with said body portion and adapted to be bent to and from the plane thereof, said wing or wings being substantially plain and flat to nearly the outer end or ends thereof and provided with a bump forming a raised portion adjacent their free ends on the side of the burr or sharp edge formed incident to the stamping or cutting operation to prevent injury to the fingers of the operator by said bur or sharp edge.

2. A fastener of the character described stamped from sheet metal stock and having a central or body portion, means for securing said central or body portion to an envelope, one or more wings integral with said body portion and adapted to be bent to and from the plane thereof, said wing or wings being substantially plain and flat to nearly the outer end or ends thereof and tapered longitudinally with the narrowest part adjacent its connection with the body portion, and said wing or wings being each provided with a bump forming a raised portion adjacent the free ends thereof and on the side on which the bur or sharp edge is formed incident to the stamping or cutting operation to prevent injury to the fingers of the operator by said bur or sharp edge.

3. A fastener of the character described formed of sheet metal stamped from sheet metal stock and having a central or body portion, said body portion being provided with a plurality of triangular teeth cut therefrom and adapted to be passed through an envelope and bent over on the opposite side thereof to secure the fastener thereto, and oppositely disposed wings integral with the body portion and adapted to be bent to and from the plane thereof, said wings being substantially plain and flat to nearly the outer ends thereof and provided with a bump forming a raised portion adjacent their free ends and on the sides thereof on which the bur or sharp edge incident to the stamping or cutting operation is formed to prevent injury to the fingers of the operator by said bur or sharp edge.

In testimony whereof I affix my signature.

FRANK W. CURNAN.